United States Patent
Hampton et al.

(10) Patent No.: US 11,408,380 B2
(45) Date of Patent: Aug. 9, 2022

(54) DEVICES FOR PRODUCING VACUUM USING THE VENTURI EFFECT HAVING A HOLLOW FLETCH

(71) Applicant: Dayco IP Holdings, LLC, Roseville, MI (US)

(72) Inventors: Keith Hampton, Ann Arbor, MI (US); Corey Henderson, Bloomfield Hills, MI (US)

(73) Assignee: Dayco IP Holdings, LLC, Roseville, MI (US)

( * ) Notice: Subject to any disclaimer, the term of this patent is extended or adjusted under 35 U.S.C. 154(b) by 0 days.

(21) Appl. No.: 17/645,827

(22) Filed: Dec. 23, 2021

(65) Prior Publication Data

US 2022/0205416 A1 Jun. 30, 2022

Related U.S. Application Data

(60) Provisional application No. 63/130,456, filed on Dec. 24, 2020.

(51) Int. Cl.
*F04F 5/14* (2006.01)
*F02M 35/10* (2006.01)
*F04F 5/20* (2006.01)

(52) U.S. Cl.
CPC .......... *F02M 35/10118* (2013.01); *F02M 35/10157* (2013.01); *F04F 5/20* (2013.01)

(58) Field of Classification Search
CPC ....... F04F 5/20; F04F 5/54; F04F 5/42; Y10T 137/87587; Y10T 137/87643;
(Continued)

(56) References Cited

U.S. PATENT DOCUMENTS

| 3,829,247 A | 8/1974 | Edmonson |
| 4,308,241 A | 12/1981 | deVries |

(Continued)

FOREIGN PATENT DOCUMENTS

| EP | 0243783 A2 | 4/1987 |
| GB | 1279166 A | 6/1972 |

(Continued)

*Primary Examiner* — John Kwon
(74) *Attorney, Agent, or Firm* — FisherBroyles, LLP; Susan M. Oiler

(57) ABSTRACT

Devices for producing vacuum using the Venturi effect have a housing that defines a suction chamber, a motive passageway converging toward the suction chamber, a discharge passageway diverging away from the suction chamber, and a suction passageway having a first port in fluid communication with the suction chamber. Within the suction chamber, a motive exit of the motive passageway is spaced apart a distance from a discharge entrance of the discharge passageway to define a Venturi gap. A fletch that has a first hollow body section that terminates at or proximate a motive exit and a second hollow body section that terminates with a fletch entrance in fluid communication with the suction passageway upstream of the first port is present in the motive passageway. During operation, fluid flow through the motive passageway draws fluid flow through the first port into the suction chamber and through the fletch.

14 Claims, 5 Drawing Sheets
(1 of 5 Drawing Sheet(s) Filed in Color)

(58) Field of Classification Search
CPC ..... Y10T 137/87603; Y10T 137/87611; Y10T 137/87619; Y10T 137/87627; Y10T 137/87635
See application file for complete search history.

(56) References Cited

U.S. PATENT DOCUMENTS

| | | | |
|---|---|---|---|
| 4,708,829 A | 11/1987 | Bylehm et al. | |
| 5,779,523 A | 7/1998 | Mesher | |
| 6,293,294 B1 | 9/2001 | Loeb et al. | |
| 6,427,661 B1 | 8/2002 | Spannbauer | |
| 6,682,002 B2 | 1/2004 | Kyotani | |
| 6,732,524 B2 | 5/2004 | Sponton | |
| 8,474,270 B2 | 7/2013 | Schott et al. | |
| 9,581,060 B2 | 2/2017 | Fletcher et al. | |
| 9,827,963 B2 | 11/2017 | Fletcher et al. | |
| 10,100,720 B2 * | 10/2018 | Fletcher | F02B 37/004 |
| 10,151,283 B2 * | 12/2018 | Graichen | F02M 26/04 |
| 10,239,187 B2 * | 3/2019 | Fletcher | B24C 3/327 |
| 10,273,978 B2 * | 4/2019 | Fletcher | F04F 5/467 |
| 10,316,864 B2 * | 6/2019 | Fletcher | F04F 5/20 |
| 10,422,351 B2 * | 9/2019 | Fletcher | B60T 17/02 |
| 10,443,627 B2 * | 10/2019 | Fletcher | F04F 5/466 |
| 10,519,984 B2 * | 12/2019 | Fletcher | F04F 5/54 |
| 10,571,030 B2 * | 2/2020 | Hampton | F16K 27/04 |
| 10,626,888 B2 * | 4/2020 | Fletcher | F04F 5/14 |
| 10,724,550 B2 * | 7/2020 | Fletcher | F04F 5/20 |
| 2015/0300377 A1 | 10/2015 | Tell | |
| 2016/0245236 A1 | 8/2016 | Graichen et al. | |
| 2017/0016414 A1 | 1/2017 | Fletcher et al. | |
| 2018/0156171 A1 * | 6/2018 | Fletcher | F02M 35/10163 |
| 2019/0085835 A1 * | 3/2019 | Hampton | F04B 43/0054 |
| 2019/0323618 A1 | 10/2019 | Fletcher et al. | |
| 2022/0074370 A1 * | 3/2022 | Lucka | F16K 31/0675 |

FOREIGN PATENT DOCUMENTS

| | | |
|---|---|---|
| GB | 2274110 B | 12/1996 |
| GB | 2484157 A1 | 4/2012 |

* cited by examiner

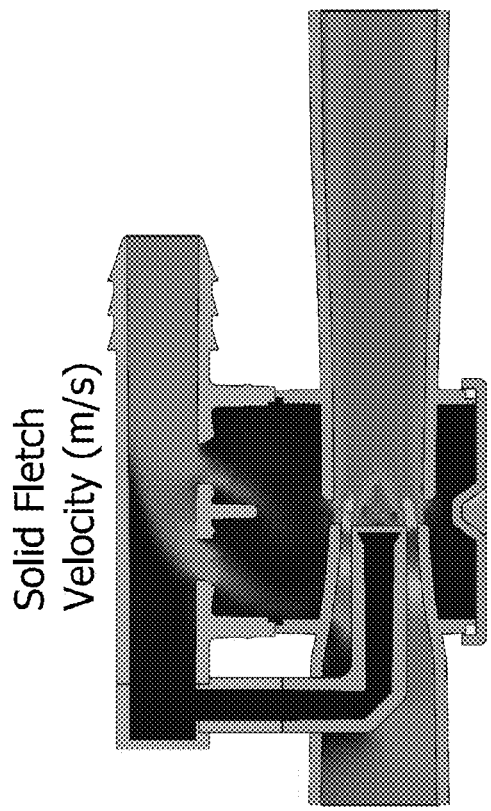
FIG. 6A Solid Fletch Pressure (Pa)
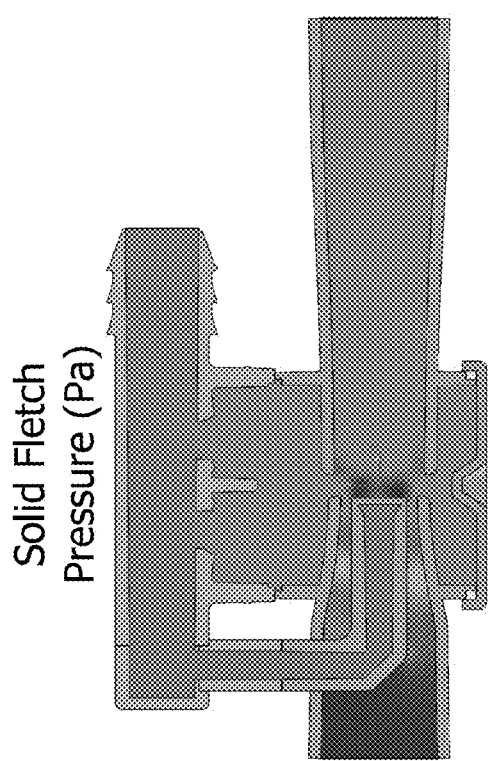
FIG. 6B Solid Fletch Velocity (m/s)
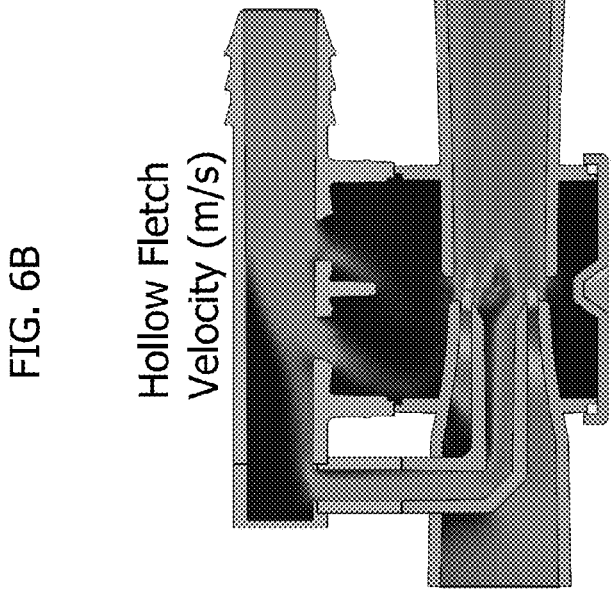
FIG. 7A Hollow Fletch Pressure (Pa)
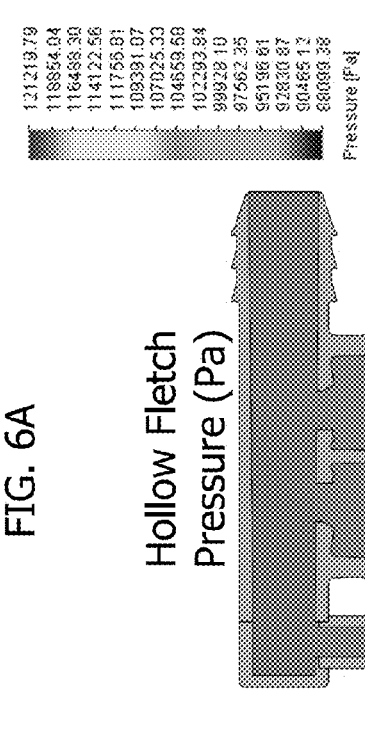
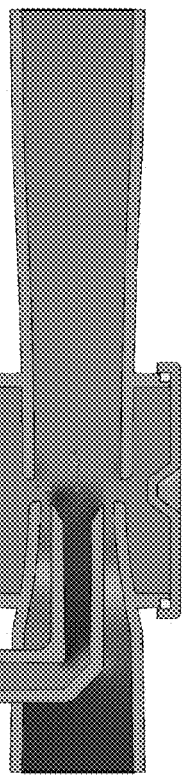
FIG. 7B Hollow Fletch Velocity (m/s)

DEVICES FOR PRODUCING VACUUM USING THE VENTURI EFFECT HAVING A HOLLOW FLETCH

RELATED APPLICATIONS

This application claims the benefit of U.S. Provisional Application No. 63/130,456, filed Dec. 24, 2020, the entirety of which is incorporated herein by reference.

TECHNICAL FIELD

This application relates to devices for producing vacuum using the Venturi effect, more particularly to such devices having a hollow fletch in the motive section. The hollow fletch is in fluid communication with the suction passageway upstream of the junction with the Venturi gap, which provides increased suction flow while minimizing flow losses.

BACKGROUND

Engines, for example vehicle engines, are being downsized and boosted, which is reducing the available vacuum from the engine. This vacuum has many potential uses, including use by the vehicle brake booster.

One solution to this vacuum shortfall is to install a vacuum pump. Vacuum pumps, however, have a significant cost and weight penalty to the engine, their electric power consumption can require additional alternator capacity, and their inefficiency can hinder fuel economy improvement actions.

Another solution is an aspirator or ejector that generates vacuum by creating an engine air flow path that is parallel to the throttle, referred to as an intake leak. This leak flow passes through a Venturi having a fletch in the motive section that generates a suction vacuum. The problem with current fletches is that the abrupt change in shape near the motive exit causes flow losses.

A need exists for improved fletch designs within a Venturi device that generate increased suction flow while minimizing flow losses.

SUMMARY

In all aspects, devices for producing vacuum using the Venturi effect are disclosed that have a housing defining a suction chamber, a motive passageway converging toward and in fluid communication with the suction chamber, a discharge passageway in fluid communication with the suction chamber, and a suction passageway having a first port in fluid communication with the suction chamber. Within the suction chamber, a motive exit of the motive passageway is spaced apart a distance from a discharge entrance of the discharge passageway to define a Venturi gap. A fletch is present in the motive passageway. The fletch has a first hollow body section positioned centrally within the motive passageway and defining a fletch exit flush with the motive exit or terminating within the motive passageway proximate the motive exit. The fletch has a second hollow body section extending through a motive passageway wall and terminating with a fletch entrance in fluid communication with the suction passageway upstream of the first port. During operation, fluid flow from the motive passageway to the discharge passageway draws fluid flow through the first port of the suction passageway into the suction chamber and through the fletch into the suction passageway.

In all aspects, the discharge passageway diverges away from the suction chamber. In one embodiment, the motive and discharge passageways both diverge in cross-sectional area away from the suction chamber as a hyperbolic or parabolic function. The motive passageway and the discharge passageway each protrude into the suction chamber as a spout, and the exterior surface of the spout of the motive passageway can converge toward the motive exit.

The suction chamber defines a check valve housing a sealing disc translatable between an open position and a closed position based solely on pressure differentials. The open position is defined by fingers protruding from positions proximate the motive passageway and the discharge passageway toward the suction passageway or by an insert comprising an outer support seatable in the suction chamber and an inner annular ring spaced radially inward from the outer support by a rib that angle axially toward a central longitudinal axis of the suction chamber to position an upper surface of the inner annular ring a distance axially beyond an upper surface of the outer support. The cross-sectional area of the motive exit is smaller than the cross-sectional area of the discharge entrance.

In one embodiment, a cap is sealingly fitted to the suction chamber to define the bottom thereof opposite the suction passageway.

In all embodiments, with respect to the fletch, the exterior shape of the first hollow body section matches the shape of the interior profile of the motive passageway within the diverging portion thereof. The first hollow body section has a rectangular exterior shape and the interior profile of the motive passageway within the diverging portion is rectangularly-shaped. The first hollow body section has a circular or elliptical exterior shape and the interior profile of the motive passageway within the diverging portion is circularly- or elliptically-shaped. In one embodiment, the fletch is integrally molded as part of the housing.

In another aspect, engine systems have the Venturi device described herein, a source of pressure fluidly connected to the motive passageway, a device requiring vacuum fluidly connected to the suction passageway, and a pressure lower than the source of pressure fluidly connected to the discharge passageway. The source of pressure is boost pressure from a compressor of a turbocharger or supercharger or is atmospheric pressure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6A represents CFD modeling of the pressure of the fluids when the Venturi effect creates vacuum flow within an aspirator of the inventive configuration but having a solid fletch.

FIG. 6B represents CFD modeling of the velocity of fluids when the Venturi effect creates vacuum flow within an aspirator of the inventive configuration but having a solid fletch.

FIG. 7A represents CFD modeling of the pressure of the fluids when the Venturi effect creates vacuum flow within an aspirator of the inventive configuration having a hollow fletch.

FIG. 7B represents CFD modeling of the velocity of the fluids when the Venturi effect creates vacuum flow within an aspirator of the inventive configuration having a hollow fletch.

DETAILED DESCRIPTION

Figure 1:
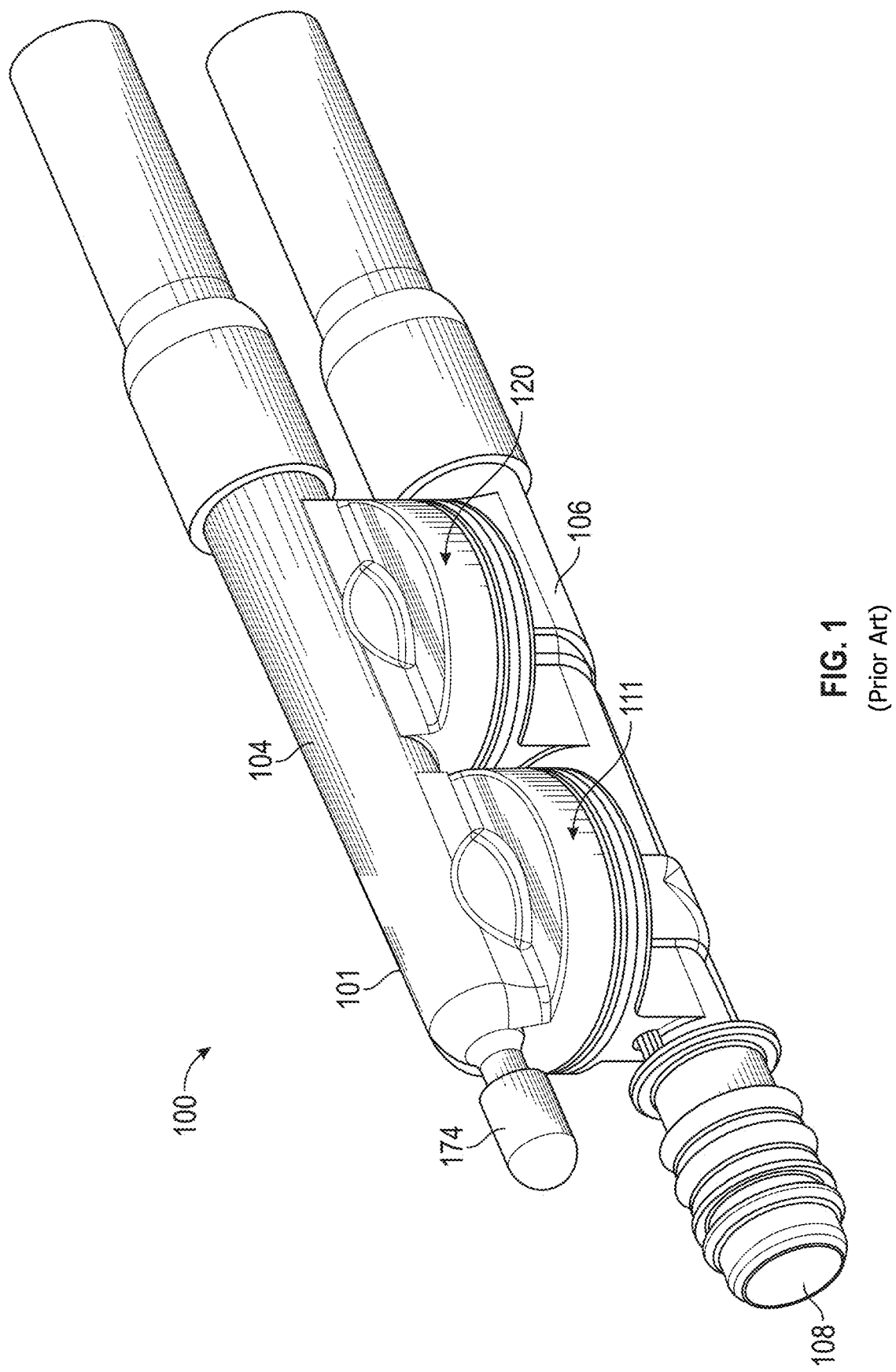
FIG. 1 is a side, perspective view of a prior art aspirator.

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof.

FIG. 1 is an external view of a Venturi device incorporating a check valve assembly, generally identified by reference number 100, for use in an engine, for example, in a vehicle's engine. The engine may be an internal combustion engine, and the vehicle and or engine may include a device requiring vacuum. Check valves and/or aspirators are often connected to an internal combustion engine before the engine throttle and after the engine throttle. The engine and all its components and/or subsystems are not shown in the figures, except for a few boxes included to represent specific components of the engine as identified herein. It is understood that the engine components and/or subsystems may include any commonly found in vehicle engines. While the embodiments in the figures are referred to as "aspirators" because the motive port 108 is illustrated as being connected to atmospheric pressure, the embodiments are not limited thereto. In other embodiments the motive port 108 may be connected to boosted pressure, such as the pressures attributed to boosted air produced by a turbocharger or supercharger, and as such the Venturi device is preferably referred to as an "ejector."

The device requiring vacuum 102 may be a vehicle brake boost device, fuel vapor purge system, positive crankcase ventilation system, a hydraulic and/or pneumatic valve, automatic transmission, air conditioner, or any other engine system or component in need of vacuum.

The Venturi device 100 includes a housing 101, which as illustrated is formed of an upper housing 104 and a lower housing 106 sealingly connected to one another. The designations of upper and lower portions are relative to the drawings as oriented on the page, for descriptive purposes, and are not limited to the illustrated orientation when utilized in an engine system. Preferably, upper housing portion 104 is joined to lower housing portion 106 by sonic welding, heating, or other conventional methods for forming an airtight seal therebetween. The Venturi device includes a first check valve 111 and a second check valve 120 and has a cap 174 closing an auxiliary port.

Figure 2:
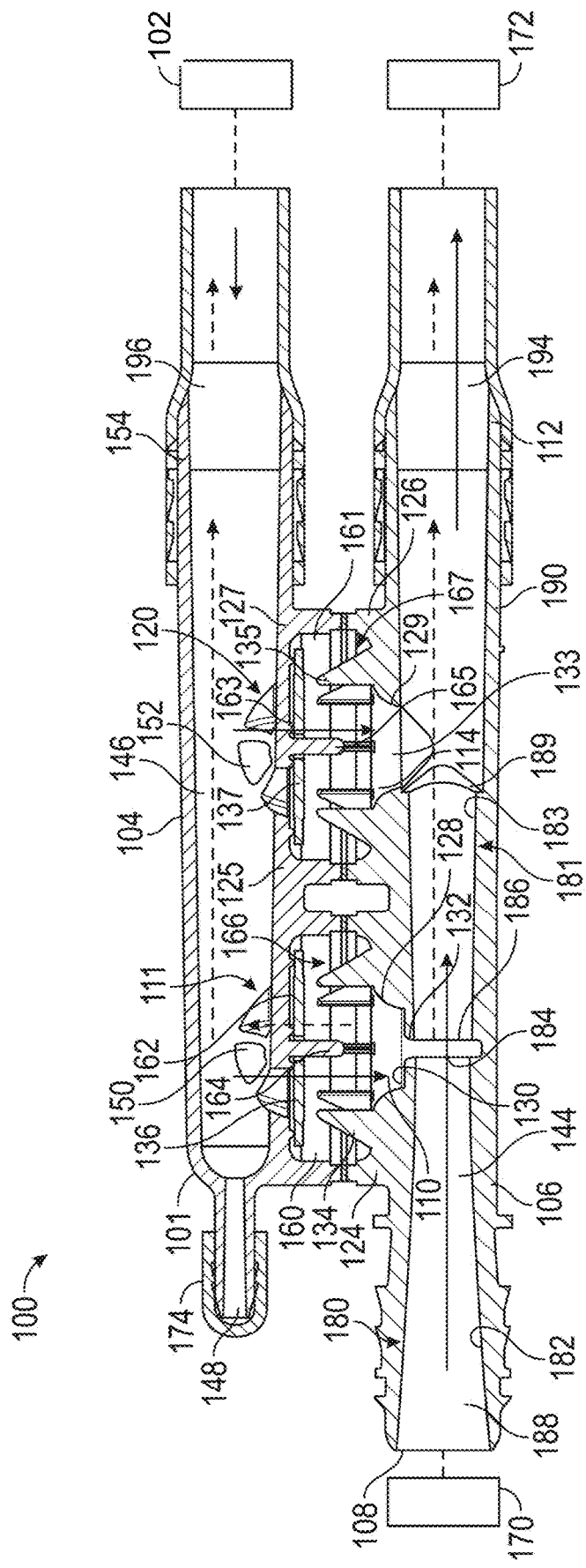
FIG. 2 is a side, longitudinal cross-sectional plan view of the prior art aspirator of FIG. 1.

As shown representatively in FIG. 2, the Venturi device 100 is connectable to a device requiring vacuum 102 at a suction port 110 and creates vacuum for said device 102 by the flow of air through a passageway 144, extending generally the length of the lower housing 106 of the Venturi device, designed to create the Venturi effect. The lower housing portion 106 includes a plurality of ports, some of which are connectable to components or subsystems of the engine. The ports of the lower housing 106 include: (1) a motive port 108, which in one embodiment supplies clean air from the engine intake air cleaner 170, typically obtained upstream of the throttle of the engine; (2) a Venturi gap 160 (a lineal distance between a motive exit 184 and a discharge entrance 186); (3) a discharge port 112, which is the illustrated embodiment is connected to an engine intake manifold 172 downstream of the throttle of the engine; and, optionally, (4) a bypass port 114. Check valve 111 is preferably arranged to prevent fluid from flowing the lower housing 106 to the device requiring vacuum 102. The bypass port 114 may be connected to the device requiring vacuum 102 and, optionally, may include a check valve 120 in the fluid flow path therebetween. Check valve 120 is preferably arranged to prevent fluid from flowing from the bypass port 114 to the application device 102.

As shown in FIG. 2, lower housing 106 includes lower valve seats 124, 126, one each for the first check valve 11 and the second check valve 120. Each lower valve seat 124, 126 is defined by a continuous outer wall 128, 129, and, optionally, a bottom wall such as wall 130 in lower valve seat 124. A bore 132, 133 is defined in each lower valve seat 124, 126, respectively, to allow for air flow communication with air passageway 144. Each lower valve seat 124, 126 includes a plurality of radially spaced fingers 134, 135 extending upwardly from an upper surface thereof. The radially spaced fingers 134, 135 serve to support a seal member 136, 137 translatable between an open position and a closed position based solely on pressure differentials.

Referring again to FIGS. 1-2, the upper housing 104 is configured for mating to or with the lower housing portion 106 to form the check valves 111, 120, if both are present. Upper housing 104 defines a suction passageway 146 extending the length thereof and defines a plurality of ports, some of which are connectable to components or subsystems of the engine. The ports include: (1) a first port 148 that may be capped with cap 174 or may be connected to a component or subsystem of the engine; (2) a second port 150 (part of the inlet port for chamber/cavity 166) in fluid communication with the bore 132 in the lower housing portion 106 which is in fluid communication with the Venturi gap 160, and between which the seal member 136 is disposed; (3) a third port 152 (part of the inlet port for chamber/cavity 167) in fluid communication with the bypass port 114 in the lower housing portion 106, and between which the seal member 137 is disposed; and (4) a suction port 110 which functions as an inlet connecting the Venturi device to the device requiring vacuum 102.

The upper housing 104 includes upper valve seats 125, 127. Each upper valve seat 125, 127 is defined by continuous outer wall 160, 161 and bottom wall 162, 163. Both upper valve seats 125, 127 may include a pin 164, 165 extending downwardly from the bottom walls 162, 163, respectively, toward the lower housing 106. The pins 164, 165 are guides for translation of the sealing members 136, 137 within the cavities 166, 167 defined by the mated upper valve seat 125 with the lower valve seat 124 and defined by the mated upper valve seat 127 with the lower valve seat 126. Accordingly, each sealing member 136, 137 includes a bore therethrough sized and positioned therein for receipt of the pin 164, 165 within its respective cavity 166, 167.

The passageway 144 in the lower housing portion 106 has an inner dimension along a central longitudinal axis that includes a first tapering portion 182 (also referred to herein as the motive cone) in the motive section 180 of the lower housing 106 coupled to a second tapering portion 183 (also referred to herein as the discharge cone) in the discharge section 181 of the lower housing 106. Here, the first tapering portion 182 and the second tapering portion 183 are aligned end to end (outlet end 184 of the motive section 180 to inlet end 186 of the discharge section 181). The inlet ends 188, 186 and the outlet end 184, 189 may be any circular shape, elliptical shape, or some other polygonal form and the gradually, continuously tapering inner dimension extending therefrom may define, but is not limited to, a hyperboloid or a cone. Some example configurations for the outlet end 184 of the motive section 180 and inlet end 186 of the discharge section 181 are presented in co-pending U.S. Pat. No. 9,827,963, incorporated by reference herein in its entirety.

As seen in FIG. 2, the first tapering portion 182 terminates at a fluid junction with bore 132, which is in fluid communication therewith and with the Venturi gap 160, and at this junction the second tapering portion 183 begins and extends away from the first tapering portion 182. The second tapering portion 183 is also in fluid communication with the Venturi gap 160 and the bore 132. The second tapering portion 183 then forms a junction with the bypass port 114 proximate the outlet end 189 of the second tapering portion and is in fluid communication therewith. The first and second tapering portions 182, 183 typically share the central longitudinal axis of the lower housing portion 106. The second tapering portion 183 tapers gradually, continuously from a smaller dimensioned inlet end 186 to a larger dimensioned outlet end 189. The optional bypass port 114 intersects the discharge section 190 as described above to be in fluid communication with the second tapering section 183. The bypass port 114 may intersect the second tapering section 183 adjacent to, but downstream of the outlet end 189. The lower housing 106 may thereafter, i.e., downstream of this intersection of the bypass port, continue with a cylindrically uniform inner passage until it terminates at the discharge port 112. Each of the ports 108 and 112 may include a connector feature on the outer surface thereof for connecting the passageway 144 to hoses or other features in the engine.

When the Venturi device 100 is connected into an engine system, the check valves 111 and 120 functions as follows: as the engine operates, the intake manifold 172 draws air into the motive port 180, through passageway 144 and out the discharge port 112. This creates a partial vacuum in the check valve 111 and passageway 146 to draw seal 136 downward against the plurality of fingers 134, 135. Due to the spacing of fingers 134, 135, fluid flow from passageway 144 to passageway 146 is allowed. The partial vacuum created by the operation of the engine serves in the vacuum assistance of at least the operation of the device requiring vacuum 102. Then as pressure differential change, the first check valve 111 closes and the second check valve 120 opens to allow fluid flow to bypass the Venturi gap 160.

Figure 3:
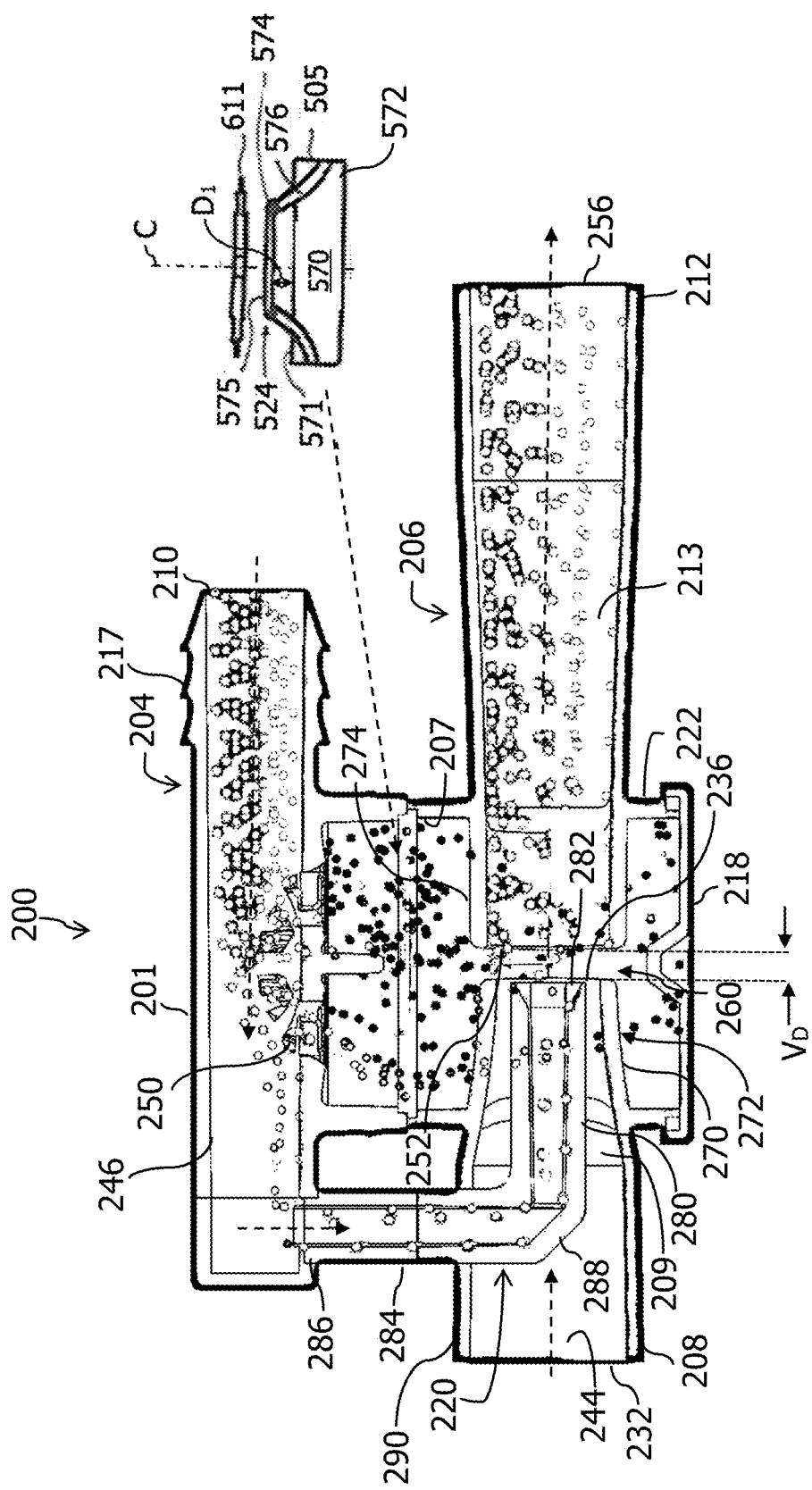
FIG. 3 is a side, longitudinal, cross-sectional view of a first embodiment of an improved aspirator having a hollow fletch in the motive passageway.

Referring now to FIG. 3, a Venturi device 200 for producing vacuum using a Venturi effect with the inclusion of a hollow fletch 220 in the motive passageway 209 is illustrated in a longitudinal cross-section with varying shades of spheres representing air flow of different velocities. Darker spheres represent faster velocities. The device 200 may be used in an engine, for example, in a vehicle's engine (an internal combustion engine) to provide vacuum to a device requiring vacuum as described above. Venturi device 200 includes a housing 201 having an upper housing 204 and a lower housing 206 sealingly connected to one another to define a suction chamber 207 in fluid communication with passageway 244, which extends from the motive entrance 232 of the motive port 208 to the discharge exit 256 of the discharge port 212. The device 200 has at least three ports that are connectable to an engine or components connected to the engine. The ports include: (1) the motive port 208; (2) the suction port 210, which can to a device requiring vacuum as shown in FIG. 2; and (3) a discharge port 212. Each of these ports 208, 210, and 212 may include a connector feature 217 on an outer surface, as shown on the suction port 210, for connecting the respective port to a hose or other component in an engine.

The housing 201 defines a suction chamber 207. The suction chamber may have different configurations, but the one illustrated has cylindrical wall 222 with an enclosed bottom, closed by a cap 218. In another embodiment, the suction chamber when viewed in a transverse cross-section may be generally pear-shaped, as disclosed in co-owned U.S. Pat. No. 10,443,627 having opposing ends walls oriented transverse to a central longitudinal axis of passageway 244.

Still referring to FIG. 3, the motive port 208 defines a motive passageway 209 converging toward the suction chamber 207 and in fluid communication therewith, the discharge port 212 defines a discharge passageway 213 diverging away from the suction chamber 207 and in fluid communication therewith, and the suction port 210 defines a suction passageway 246 in fluid communication with the suction chamber 207 through a first port 250. The suction passageway 246 is typically a cylindrical passageway of constant dimension(s). These converging and diverging sections gradually, continuously taper along the length of at least a portion of the interior passageway 209 and 213. The motive port 208 defines a motive entrance 232 and has a motive exit 236 at the opposing end, which is the terminus of the converging motive passageway 209 proximate or within the suction chamber 207. Similarly, the discharge port 212 defines a discharge entrance 252, proximate or within the suction chamber 207, and a discharge exit 256 at the opposing end. The motive exit 236, is aligned with and spaced apart from the discharge entrance 252 to define Venturi gap 160. The Venturi gap 160, as used herein, means the lineal distance VD between the motive exit 236 and the discharge entrance 252. The motive exit 236 and/or the discharge entrance 252 may have a first corner radius inside the motive passageway 209 as disclosed in co-owned U.S. Pat. No. 10,443,627.

Figure 5:
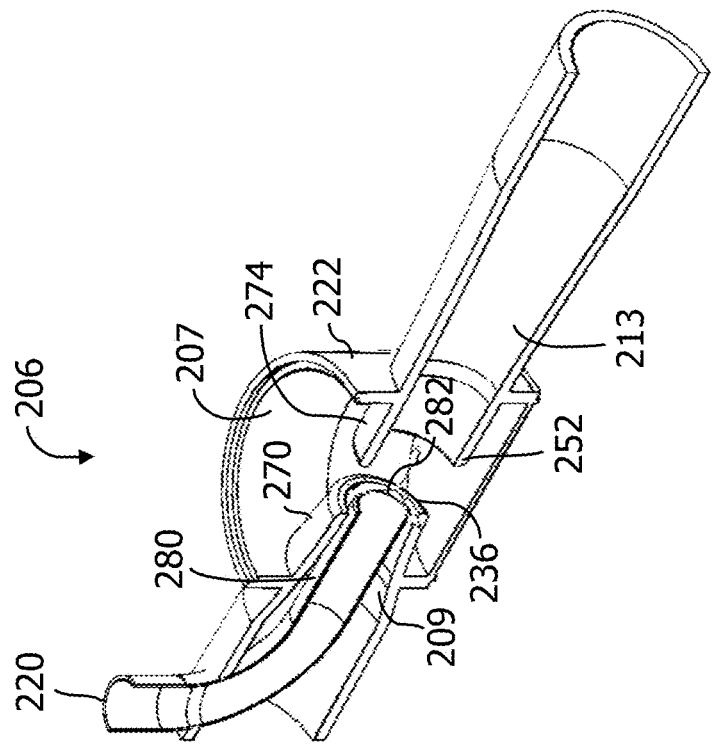
FIG. 5 is a side, longitudinal cross-sectional, perspective view of a lower body of an aspirator through an elliptically-shaped hollow fletch.
Figure 4:
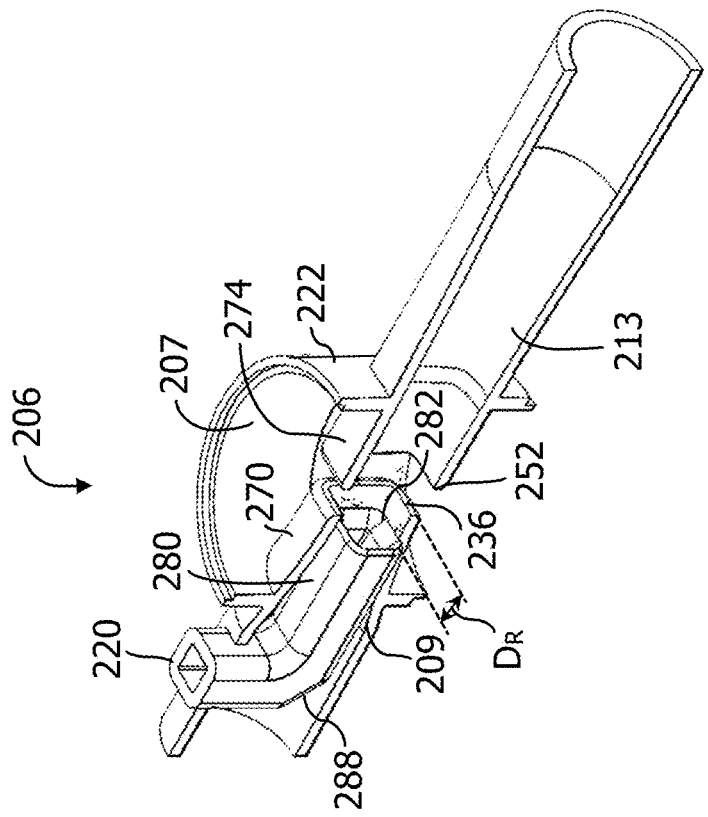
FIG. 4 is a side, longitudinal cross-sectional, perspective view of the lower body of FIG. 3 without cross-sectioning through the rectangularly-shaped hollow fletch.

Turning to FIGS. 3-5, the motive passageway 209 terminates in a spout 270 protruding into the suction chamber 207. The spout 270 is disposed spaced apart from all one or more sidewalls 222 of the suction chamber 207, thereby providing suction flow around the entirety of an exterior surface 272 of the spout 270. The exterior surface 272 is converges, gradually and continuously tapers toward the discharge entrance 252. Similarly, the discharge passageway 213 terminates in a spout 274 protruding into the suction chamber opposite the spout 270. The spout 274 is disposed spaced apart from all one or more sidewalls 222 of the suction chamber 207, thereby providing suction flow around the entirety of an exterior surface of spout 274.

As shown in FIG. 3, the motive passageway 209 and the discharge passageway 213 both converge in cross-sectional area toward the suction chamber 207 as a hyperbolic or parabolic function that defines flow lines at the motive exit 236 that are parallel to one another, i.e., the slope of both functions is zero at the Venturi gap. The motive entrance 232 and the discharge exit 256 may be the same shape or different and may be generally rectangular, elliptical or circular. In FIG. 3, motive entrance 232 and the discharge exit 256 are depicted as circular, but the motive exit 236 and the discharge entrance 252, i.e., the interior shape of each opening, are elliptically-shaped. The interior of the motive passageway 209 and/or the discharge passageway 213 may be constructed to have the same general shape.

As best seen in FIG. 3, the cross-sectional area of the motive exit 236 is smaller than the cross-sectional area of the discharge entrance 252; this difference is referred to as the offset. The offset of the cross-sectional areas may vary depending upon the parameters of the system into which the device 100 is to be incorporated. In one embodiment, the offset may be in the range of about 0.1 mm to about 2.5 mm, or more preferably in a range of about 0.3 mm to about 1.5 mm. In another embodiment, the offset may be in the range of about 0.5 mm to about 1.2 mm, or more preferably in a range of about 0.7 mm to about 1.0 mm.

The fletch 220 serves to block motive flow within the motive passageway 209 at the center of the motive passageway because flow at this position does not provide any suction. It is more effective to concentrate all the flow along the interior walls defining the motive passageway because this flow produces suction as it passes through the Venturi gap into the discharge passageway. The fletch 220 is a continuous tube or conduit that provides a secondary pathway for fluid communication between the suction passageway 246 and the Venturi gap 160. The fletch 220 has a first hollow body section 280 positioned centrally within the motive passageway 209 and defining a fletch exit 282 at the motive exit 236 (flush therewith) as shown in FIGS. 3 and 5 or within 1-5 mm inward within the motive passageway 209 away from the motive exit 236 as shown in FIG. 4, which is referred to herein as a recess depth $D_R$. The fletch 220 has a second hollow body section 284 extending through a wall 290 of the motive port 208 or motive passageway 209 and terminating with a fletch entrance 286 in fluid communication with the suction passageway 246 upstream of the first port 250. The second hollow body section 284 may be perpendicular to the first hollow body section 280 as shown in the figures but is not limited thereto. An elbow 288 may be present to connect the first and second hollow body sections 280, 284 to one another.

As shown in FIGS. 4 and 5, the motive exit 236 and the discharge entrance 252 are non-circular as explained in co-owned U.S. Pat. No. 9,827,963 because a non-circular shape having the same area as a passageway with a circular cross-section is an increase in the ratio of perimeter to area. There are an infinite number of possible shapes that are not circular, each with a perimeter and a cross-sectional area. These include polygons, or straight-line segments connected to each other, non-circular curves, and even fractal curves. To minimize cost, a curve is simpler and easy to manufacture and inspect and has a desirable perimeter length. In particular, elliptical- or polygonal-shaped embodiments for the internal cross-sections of the motive and discharge passageways are cost effective.

In the embodiment of FIG. 4, the motive exit 236 and motive passageway 209 have a rectangular shape (a square being included as one type of rectangle), in particular an internal rectangular profile. Likewise, the fletch 220 has an internal and an external rectangular shape matching that of the motive passageway 209, but of a smaller dimension to fill the central flow area of the motive passageway. Thus, the first hollow body section 280 of the fletch 220 has a rectangular shape matching the shape of the interior profile of the motive passageway within the diverging portion thereof. The fletch exit 282 is recessed within the motive passageway away from the motive exit 236. The depth of the recess $D_R$ is in a range of 1 mm to 5 mm. Here too, the spout 274 defining the discharge entrance 252 has a rectangular shape for its interior and exterior profile.

In the embodiment of FIG. 5, the motive exit 236 and motive passageway 209 have an elliptical shape (a circle being included as one type of an ellipse), in particular an internal elliptical profile. Likewise, the fletch 220 has an internal and an external elliptical shape matching that of the motive passageway 209, but of a smaller dimension to fill the central flow area of the motive passageway. Thus, the first hollow body section 280 of the fletch 220 has an elliptical shape matching the shape of the interior profile of the motive passageway within the diverging portion thereof. Here, the fletch exit 282 is flush with the motive exit 236. Here too, the spout 274 defining the discharge entrance 252 has an elliptical shape for its interior and exterior profile.

Referring again to FIG. 3, the suction chamber 207 defines a check valve housing a sealing disc 611 translatable between an open position and a closed position based solely on pressure differentials within a system in which the Venturi device is in fluid communication within. The open position may be defined by fingers protruding from positions proximate the motive passageway and the discharge passageway toward the suction passageway as disclosed above with respect to FIG. 2 or by a check valve insert 505 shown in FIG. 3 that define a first seat for the sealing disc 611. The check valve insert 505 has an outer support 570 seatable in the suction chamber 207, an upper surface 571 and a lower surface 572, an inner annular ring 574 spaced radially inward from the outer support 570 by a rib 576 that angles axially toward a central longitudinal axis C to position an upper surface 575 of the inner annular ring 574 a distance axially Di beyond the upper surface 571 of the outer support. The check valve insert 505 may two ribs, three ribs, four ribs, or ten ribs connecting the inner annular ring 574 to the outer support 570 as shown in co-owned, co-pending U.S. 2019/0323618, filed Apr. 23, 2019. These are just example embodiments, and any number of ribs are possible, including a single rib.

The outer support 570 may be an annular ring that is circular, but the outer support may be oval or may be a polygonal-shaped ring or any other shaped needed to be seatable within the suction chamber at a desired position. The inner annular ring 574 is typically circular or oval in shape. In one embodiment, the upper surface 575 is a continuous surface in one plane perpendicular to the central longitudinal axis C. In another embodiments, the upper surface 575 undulates with two opposing troughs 579. In yet another embodiment, the upper surface 575 is angled downward and radially outward toward the outer support 570 over a minor arc extending 20 degrees up to 170 degrees along the inner annular ring 574, thereby defining an inclined surface portion of the upper surface.

In operation, the device 200, in particular the suction port 210, is connected to a device requiring vacuum (see FIG. 2), and the device 200 creates vacuum for said device by the flow of fluid, typically air, through passageway 244, extending generally the length of the device, and through the Venturi gap 160 defined thereby within the suction chamber 207. The flow of fluid from the motive port 208 to the discharge port 212 draws the fluid down the motive passageway, which can be a straight cone, a hyperbolic profile, or a parabolic profile, as described above and the reduction in area causes the velocity of the air to increase. Because this is an enclosed space, the laws of fluid mechanics state that the static pressure must decrease when the fluid velocity increases. As air continues to travel to the discharge port, it travels through the discharge entrance 252 and discharge passageway 213, which is either a straight cone, a hyperbolic profile, or a parabolic profile. This fluid flow creates suction drawing fluid in through the suction port 210, along the suction passageway 246 and into the suction chamber 207 through the first port 250 and through the fletch entrance 286, which is upstream of the first port 250, for an additive effect on the suction.

Color computational fluid dynamics models are provided in FIGS. 6A through 7B. FIGS. 6A and 6B are of a Venturi device with a solid (non-hollow) fletch for comparison with the Venturi device disclosed herein that has a hollow fletch. FIGS. 7A and 7B are of a Venturi device having a hollow fletch in fluid communication with the suction passageway upstream of a first port therein. FIGS. 6A and 7A are computational fluid dynamics models of the pressures in pascals present within the Venturi devices. The highest pressures being present at the motive entrance (red, 121219.79 Pa) of both embodiments to the lowest pressure being present in the Venturi gap in FIG. 6A (dark blue, 88099.38 Pa) compared to the entire first hollow body section of the fletch and the Venturi gap. FIGS. 6B and 7B are computational fluid dynamics models of the velocities in m/s present within the Venturi devices. As seen in FIG. 6B there is no velocity in the solid fletch or upstream of the first port of the suction passageway. In stark contrast, there is considerable velocity to the flow of fluid upstream of the first port and in the hollow fletch of FIG. 7B. The hollow fletch not only adds fluid flow therethrough, but its presence demonstrates an increase in velocity at the first port. The models demonstrated that Venturi devices of equivalent structure, other than a solid fletch versus a hollow fletch, have different suction flow rates. The presence of the hollow fletch increased the suction flow rate by 0.8 g/s from 4.7 g/s to 5.5 g/s, which is a 17% improvement in the flow rate.

The devices disclosed herein may be made of a plastic material or other suitable material(s) for use in a vehicle engine, one that can withstand engine and road conditions, including temperature, moisture, pressures, vibration, and dirt and debris, and may be made by injection molding or other casting or molding processes.

Although the invention is shown and described with respect to certain embodiments, it is obvious that modifications will occur to those skilled in the art upon reading and understanding the specification, and the present invention includes all such modifications.

What is claimed is:

1. A device for producing vacuum using the Venturi effect comprising:
    a housing defining:
        a suction chamber;
        a motive passageway converging toward and in fluid communication with the suction chamber;
        a discharge passageway in fluid communication with the suction chamber;
        wherein, within the suction chamber, a motive exit of the motive passageway is spaced apart a distance from a discharge entrance of the discharge passageway to define a Venturi gap;
        a suction passageway having a first port in fluid communication with the suction chamber; and
        a fletch having a first hollow body section positioned centrally within the motive passageway and defining a fletch exit flush with the motive exit or terminating within the motive passageway proximate the motive exit, and having a second hollow body section extending through a motive passageway wall and terminating with a fletch entrance in fluid communication with the suction passageway upstream of the first port;
    wherein fluid flow from the motive passageway to the discharge passageway draws fluid flow through the first port of the suction passageway into the suction chamber and through the fletch into the suction passageway.

2. The device of claim 1, wherein the discharge passageway diverges away from the suction chamber.

3. The device of claim 1, wherein the motive passageway and the discharge passageway both diverge in cross-sectional area away from the suction chamber as a hyperbolic or parabolic function.

4. The device of claim 1, wherein the motive passageway and the discharge passageway each protrude into the suction chamber as a spout.

5. The device of claim 4, wherein the exterior surface of the spout of the motive passageway converges toward the motive exit.

6. The device of claim 1, wherein the suction chamber defines a check valve housing a sealing disc translatable between an open position and a closed position based solely on pressure differentials.

7. The device of claim 6, wherein the open position is defined by fingers protruding from positions proximate the motive passageway and the discharge passageway toward the suction passageway or by an insert comprising an outer support seatable in the suction chamber and an inner annular ring spaced radially inward from the outer support by a rib that angle axially toward a central longitudinal axis of the suction chamber to position an upper surface of the inner annular ring a distance axially beyond an upper surface of the outer support.

8. The device of claim 1, wherein the cross-sectional area of the motive exit is smaller than the cross-sectional area of the discharge entrance.

9. The device of claim 1, further comprising a cap sealingly fitted to the suction chamber to define the bottom thereof opposite the suction passageway.

10. The device of claim 1, wherein the exterior shape of the first hollow body section matches the shape of the interior profile of the motive passageway within the diverging portion thereof.

11. The device of claim 10, wherein the first hollow body section has a rectangular exterior shape and the interior profile of the motive passageway within the diverging portion is rectangularly-shaped.

12. The device of claim 10, wherein the first hollow body section has a circular or elliptical exterior shape and the interior profile of the motive passageway within the diverging portion is circularly- or elliptically-shaped.

13. The device of claim 1, wherein the fletch is integrally molded as part of the housing.

14. An engine system comprising:
    the Venturi device of claim 1;
    a source of pressure fluidly connected to the motive passageway;
    a device requiring vacuum fluidly connected to the suction passageway; and
    a pressure lower than the source of pressure fluidly connected to the discharge passageway;
    wherein the source of pressure is boost pressure from a compressor of a turbocharger or supercharger or is atmospheric pressure.

* * * * *